United States Patent
Holub et al.

(10) Patent No.: US 9,716,807 B2
(45) Date of Patent: Jul. 25, 2017

(54) METHODS FOR ESTIMATING WATERMARK SIGNAL STRENGTH, AN EMBEDDING PROCESS USING THE SAME, AND RELATED ARRANGEMENTS

(71) Applicant: Digimarc Corporation, Beaverton, OR (US)

(72) Inventors: Vojtech Holub, Portland, OR (US); Tomas Filler, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 6 days.

(21) Appl. No.: 14/881,448

(22) Filed: Oct. 13, 2015

(65) Prior Publication Data

US 2016/0105585 A1 Apr. 14, 2016

Related U.S. Application Data

(60) Provisional application No. 62/063,248, filed on Oct. 13, 2014.

(51) Int. Cl.
*H04N 1/40* (2006.01)
*H04L 9/32* (2006.01)
(Continued)

(52) U.S. Cl.
CPC ....... *H04N 1/32149* (2013.01); *G06T 1/0028* (2013.01); *G06T 2201/0202* (2013.01)

(58) Field of Classification Search
None
See application file for complete search history.

(56) References Cited

U.S. PATENT DOCUMENTS 5,365,048 A 11/1994 Komiya et al.
5,745,604 A * 4/1998 Rhoads ............... G06Q 20/341
382/100

(Continued)

FOREIGN PATENT DOCUMENTS

WO WO/2013/033442 3/2013

OTHER PUBLICATIONS

Jan. 12, 2017 non-final Office Action, and Jan. 13, 2017 Amendment, both from assignee's U.S. Appl. No. 15/154,572.
(Continued)

*Primary Examiner* — Madelein Nguyen
(74) *Attorney, Agent, or Firm* — Digimarc Corporation (57) ABSTRACT

The present disclosure relates to advanced signal processing including digital watermarking and steganography. One method includes: obtaining image data representing imagery in a first color mode; steganographically embedding a watermark signal into the image data, thereby generating watermarked image data; obtaining reader data representing an input color mode of a reader configured to detect or decode the watermarked image data, wherein the input color mode is different from the first color mode; transforming the watermarked image data from the first color mode to the input color mode; estimating a signal strength of the watermark signal within the transformed watermark image data; and visually displaying the estimated signal strength. The estimated signal strength can be visually displayed as a multi-color heat map. Of course, other combinations are described as well.

33 Claims, 2 Drawing Sheets
(1 of 2 Drawing Sheet(s) Filed in Color)

(51) Int. Cl.
*H04N 1/32* (2006.01)
*G06T 1/00* (2006.01)

(56) References Cited

U.S. PATENT DOCUMENTS

| | | | |
|---|---|---|---|
| 5,832,119 A * | 11/1998 | Rhoads | G06F 17/30876 375/E7.089 |
| 5,859,920 A | 1/1999 | Daly et al. | |
| 5,862,260 A | 1/1999 | Rhoads | |
| 5,949,885 A | 9/1999 | Leighton | |
| 5,974,150 A * | 10/1999 | Kaish | G06K 19/086 283/85 |
| 6,122,403 A | 9/2000 | Rhoads | |
| 6,175,627 B1 | 1/2001 | Petrovic et al. | |
| 6,208,735 B1 | 3/2001 | Cox et al. | |
| 6,246,775 B1 | 6/2001 | Nakamura et al. | |
| 6,345,104 B1 | 2/2002 | Rhoads | |
| 6,408,082 B1 | 6/2002 | Rhoads et al. | |
| 6,449,377 B1 | 9/2002 | Rhoads | |
| 6,516,079 B1 * | 2/2003 | Rhoads | G06T 1/005 348/E7.061 |
| 6,535,618 B1 * | 3/2003 | Rhoads | G06Q 20/341 382/100 |
| 6,590,996 B1 * | 7/2003 | Reed | G06T 1/0021 235/468 |
| 6,614,914 B1 | 9/2003 | Rhoads et al. | |
| 6,625,297 B1 | 9/2003 | Bradley | |
| 6,683,966 B1 * | 1/2004 | Tian | G06T 1/0028 380/28 |
| 6,698,658 B2 | 3/2004 | McQueen | |
| 6,704,869 B2 | 3/2004 | Rhoads et al. | |
| 6,718,046 B2 | 4/2004 | Reed et al. | |
| 6,738,495 B2 | 5/2004 | Rhoads et al. | |
| 6,757,406 B2 * | 6/2004 | Rhoads | G06Q 20/1235 358/3.28 |
| 6,763,123 B2 | 7/2004 | Reed et al. | |
| 6,771,797 B2 * | 8/2004 | Ahmed | G06T 1/0028 382/100 |
| 6,891,959 B2 | 5/2005 | Reed et al. | |
| 6,912,295 B2 * | 6/2005 | Reed | G06F 17/30876 382/100 |
| 6,947,571 B1 | 9/2005 | Rhoads et al. | |
| 6,988,202 B1 * | 1/2006 | Rhoads | G06T 1/005 713/167 |
| 6,993,154 B2 | 1/2006 | Brunk | |
| 7,006,662 B2 | 2/2006 | Alattar et al. | |
| 7,013,021 B2 | 3/2006 | Gustafson | |
| 7,046,819 B2 | 5/2006 | Stach | |
| 7,054,461 B2 | 5/2006 | Zeller et al. | |
| 7,058,200 B2 | 6/2006 | Donescu et al. | |
| 7,085,396 B2 | 8/2006 | Pelly et al. | |
| 7,116,781 B2 * | 10/2006 | Rhoads | G06T 1/0064 380/59 |
| 7,130,442 B2 | 10/2006 | Braudaway et al. | |
| 7,197,164 B2 * | 3/2007 | Levy | G06T 1/0028 348/463 |
| 7,231,061 B2 * | 6/2007 | Bradley | G06T 1/0064 358/3.28 |
| 7,263,203 B2 | 8/2007 | Rhoads et al. | |
| 7,277,468 B2 * | 10/2007 | Tian | G06T 1/0042 348/E17.003 |
| 7,286,685 B2 | 10/2007 | Brunk et al. | |
| 7,319,775 B2 * | 1/2008 | Sharma | G06T 1/0064 370/527 |
| 7,352,878 B2 | 4/2008 | Reed et al. | |
| 7,502,759 B2 * | 3/2009 | Hannigan | G06Q 30/02 123/201 |
| 7,607,016 B2 | 10/2009 | Brunk et al. | |
| 7,656,930 B2 * | 2/2010 | Tian | G06T 1/0021 375/130 |
| 7,657,058 B2 | 2/2010 | Sharma | |
| 7,738,673 B2 * | 6/2010 | Reed | G06T 1/0028 358/3.28 |
| 7,796,826 B2 | 9/2010 | Rhoads et al. | |
| 7,916,354 B2 * | 3/2011 | Rhoads | G06T 1/005 283/93 |
| 7,986,807 B2 | 7/2011 | Stach et al. | |
| 8,005,254 B2 * | 8/2011 | Rhoads | G06T 1/005 380/200 |
| 8,051,295 B2 | 11/2011 | Brunk et al. | |
| 8,127,137 B2 * | 2/2012 | Levy | G06Q 20/401 348/509 |
| 8,243,980 B2 | 8/2012 | Rhoads et al. | |
| 8,245,926 B2 | 8/2012 | Guess et al. | |
| 8,301,893 B2 * | 10/2012 | Brundage | G06T 1/0071 713/176 |
| 8,321,350 B2 * | 11/2012 | Durst, Jr. | G06K 7/1417 162/110 |
| 8,339,668 B2 * | 12/2012 | Kato | H04N 1/32144 358/1.9 |
| 8,488,837 B2 * | 7/2013 | Bae | G06T 1/0064 358/3.28 |
| 8,610,958 B2 * | 12/2013 | Rossier | H04N 1/4055 283/113 |
| 8,923,546 B2 * | 12/2014 | Reed | G06T 1/0028 382/100 |
| 9,224,184 B2 | 12/2015 | Bai | |
| 2001/0019618 A1 * | 9/2001 | Rhoads | G06K 7/1417 382/100 |
| 2002/0003903 A1 * | 1/2002 | Engeldrum | G06F 3/14 382/233 |
| 2002/0009208 A1 * | 1/2002 | Alattar | G06F 17/30876 382/100 |
| 2002/0054355 A1 * | 5/2002 | Brunk | G06T 1/0071 358/3.28 |
| 2002/0157005 A1 * | 10/2002 | Brunk | G06Q 20/401 713/176 |
| 2002/0191812 A1 * | 12/2002 | Kim | G06T 1/0028 382/100 |
| 2003/0002710 A1 | 1/2003 | Rhoads | |
| 2003/0009670 A1 * | 1/2003 | Rhoads | G06T 1/0021 713/176 |
| 2003/0025423 A1 | 2/2003 | Miller et al. | |
| 2003/0053653 A1 * | 3/2003 | Rhoads | G06F 17/30876 382/100 |
| 2003/0156733 A1 * | 8/2003 | Zeller | G06T 1/0078 382/100 |
| 2004/0190751 A1 * | 9/2004 | Rhoads | G06T 1/0071 382/100 |
| 2004/0263911 A1 * | 12/2004 | Rodriguez | B42D 25/29 358/3.28 |
| 2006/0171559 A1 * | 8/2006 | Rhoads | G06F 17/30876 382/100 |
| 2006/0230273 A1 * | 10/2006 | Crichton | G03G 15/50 713/176 |
| 2007/0091376 A1 * | 4/2007 | Calhoon | G06T 1/0021 358/3.28 |
| 2008/0025554 A1 * | 1/2008 | Landwehr | H04N 1/32144 382/100 |
| 2008/0137749 A1 * | 6/2008 | Tian | G06T 1/0021 375/240.19 |
| 2008/0192275 A1 * | 8/2008 | Reed | H04N 1/4078 358/1.9 |
| 2008/0309612 A1 * | 12/2008 | Gormish | G02F 1/167 345/105 |
| 2009/0046931 A1 * | 2/2009 | Xiao | G06K 9/38 382/180 |
| 2009/0060331 A1 * | 3/2009 | Liu | G06K 9/38 382/173 |
| 2009/0067671 A1 * | 3/2009 | Alattar | G06T 1/0028 382/100 |
| 2010/0008534 A1 * | 1/2010 | Rhoads | G06Q 20/341 382/100 |
| 2010/0027851 A1 * | 2/2010 | Walther | G06K 5/00 382/112 |
| 2010/0142003 A1 * | 6/2010 | Braun | H04N 1/32309 358/3.28 |
| 2012/0133993 A1 * | 5/2012 | Ohira | H04N 1/387 358/3.28 |

(56) References Cited

U.S. PATENT DOCUMENTS

| | | | |
|---|---|---|---|
| 2012/0277893 A1* | 11/2012 | Davis | H04L 65/00 700/94 |
| 2013/0223673 A1 | 8/2013 | Davis et al. | |
| 2013/0336525 A1* | 12/2013 | Kurtz | B41M 3/10 382/103 |
| 2014/0027516 A1 | 1/2014 | Fushiki | |
| 2014/0112524 A1 | 4/2014 | Bai et al. | |
| 2015/0030201 A1 | 1/2015 | Holub et al. | |
| 2015/0146262 A1* | 5/2015 | Fan | H04N 1/32133 358/3.28 |
| 2015/0156369 A1* | 6/2015 | Reed | H04N 1/32309 382/100 |
| 2015/0187039 A1 | 7/2015 | Reed et al. | |
| 2016/0034231 A1* | 2/2016 | Miyake | G06F 3/1208 358/3.28 |
| 2016/0105585 A1 | 4/2016 | Holub et al. | |
| 2016/0198064 A1* | 7/2016 | Bai | H04N 1/32309 382/100 |

OTHER PUBLICATIONS

U.S. Appl. No. 15/154,529, filed May 13, 2016.
U.S. Appl. No. 15/154,572, filed May 13, 2016.
U.S. Appl. No. 62/322,193, filed Apr. 13, 2016.
U.S. Appl. No. 61/856,476, filed Jul. 19, 2013.
U.S. Appl. No. 61/918,214, filed Dec. 19, 2013.
Avcibas, et al., "Steganalysis of Watermarking Techniques Using Images Quality Metrics", Proceedings of SPIE, Jan. 2001, vol. 4314, pp. 523-531.
Dautzenberg, "Watermarking Images," Department of Microelectronics and Electrical Engineering, Trinity College Dublin, 47 pages, Oct. 1994.
Hernandez et al., "Statistical Analysis of Watermarking Schemes for Copyright Protection of Images," Proceedings of the IEEE, vol. 87, No. 7, Jul. 1999.
Holub & Fridrich, "Digital image steganography using universal distortion," IH&MMSec '13 Proceedings of the first ACM workshop on Information hiding and multimedia security, pp. 59-68 (2013).
Kodovský, Fridrich & Holub, "On dangers of overtraining steganography to incomplete cover model," MM&Sec '11 Proceedings of the thirteenth ACM multimedia workshop on Multimedia and security, pp. 69-76 (2011).
Fridrich, Kodovský & Holub, "Steganalysis of Content-Adaptive Steganography in Spatial Domain," Information Hiding, vol. 6958 of the series Lecture Notes in Computer Science pp. 102-117, 2011.
J. Fridrich and J. Kodovský, "Rich models for steganalysis of digital images," IEEE Trans. on Information Forensics and Security, 7(3):868-882, Jun. 2012.
J. Kodovský, J. Fridrich, and V. Holub, "Ensemble classifiers for steganalysis of digital media," IEEE Trans. on Inform. Forensics and Security, 7(2):432-444, Apr. 2012.
Pevný, P. Bas, and J. Fridrich, "Steganalysis by subtractive pixel adjacency matrix," IEEE Transactions on Information Forensics and Security, 5(2):215-224, Jun. 2010.
O'Ruanaidh, "Rotation, Scale and Translation Invariant Digital Image Watermarking," Signal Processing, pp. 2-15, May 1, 1998.
S. Pereira, J. J. K. Oruanaidh, F. Deguillaume, G. Csurka and T. Pun, Template Based Recovery of Fourier-Based Watermarks Using Log-polar and Log-log Maps, in Int. Conference on Multimedia Computing and Systems Jun. 1999.
R. O. Duda, P. E. Hart, and D. G. Stork, "Pattern Classification." Wiley Interscience, 2nd edition, 2000.
Chih-Chung Chang and Chih-Jen Lin,, "LIBSVM: A Library for Support Vector Machines," ACM Transactions on Intelligent Systems and Technology, vol. 2, No. 3, Article 27, Publication date: Apr. 2011.
Kutter, "Watermarking Resisting to Translation, Rotation and Scaling," Proc. of SPIE: Multimedia Systems and Applications, vol. 3528, pp. 423-431, Boston, Nov. 1998.
O'Ruanaidh et al., "Rotation, Scale and Translation Invariant Spread Spectrum Digital Image Watermarking," Signal Processing 66, May 1, 1998, pp. 303-317.
O'Ruanaidh et al., "Rotation, Scale and translation Invariant Digital Image Watermarking," Int. Conf. on Image Proc., Oct. 1997, IEEE, pp. 536-539.
Sheng et al., "Experiments on Pattern Recognition Using Invariant Fourier-Mellin Descriptors," Journal of Optical Society of America, vol. 3. No. 6, Jun. 1986, pp. 771-776.
Su et al., "An Image Watermark Scheme to Resist Generalized Geometrical Transformations," Proc. of SPIE: Multimedia Systems and Applications III, vol. VV08, Boston, USA, Nov. 2000.
Lin et al., "Rotation, Scale, and Translation Resilient Watermarking for Images," IEEE Transactions on Image Processing, vol. 10, No. 5, May 2001, pp. 767-782.
Nikolaidis et al., "Region-Based Image Watermarking," IEEE Transactions on Image Processing, vol. 10, No. 11, Nov. 2001, pp. 1726-1740.
Su et al., "Synchronized Detection of the Block-based Watermark with Invisible Grid Embedding," Proc. SPIE vol. 4314: Security and Watermarking of Multimedia Contents III, Jan. 2001, pp. 406-417.
Pitas et al., "Region-based Image Watermarking," IEEE Transactions on Image Processing, vol. 10, No. 5, May 2001, pp. 1726-1740.
Fan, et al., "LIBLINEAR: A Library for Large Linear Classification," Journal of Machine Learning Research 9 (2008) 1871-1874.

* cited by examiner

METHODS FOR ESTIMATING WATERMARK SIGNAL STRENGTH, AN EMBEDDING PROCESS USING THE SAME, AND RELATED ARRANGEMENTS

RELATED APPLICATION DATA

This application claims benefit of U.S. Provisional Application No. 62/063,248, filed Oct. 13, 2014, which is hereby incorporated herein by reference in its entirety.

TECHNICAL FIELD

The disclosure relates generally to product packaging, image capture, signal processing, steganographic data hiding and digital watermarking.

BACKGROUND AND SUMMARY

The term "steganography" generally means data hiding. One form of data hiding is digital watermarking. Digital watermarking is a process for modifying media content to embed a machine-readable (or machine-detectable) signal or code into the media content. For the purposes of this application, the data may be modified such that the embedded code or signal is imperceptible or nearly imperceptible to a human, yet may be detected through an automated, machine-based detection process. Most commonly, digital watermarking is applied to media content such as images, audio signals, and video signals. Digital watermarks can be incorporated into images or graphics that are then printed, e.g., on product packaging.

Digital watermarking systems may include two primary components: an embedding component that embeds a watermark in media content, and a reading component that detects and reads an embedded watermark (referred to as a "watermark reader," or "watermark decoder," or simply as a "reader" or "decoder"). The embedding component (or "embedder" or "encoder") may embed a watermark by altering data samples representing the media content in the spatial, temporal or some other domain (e.g., Fourier, Discrete Cosine or Wavelet transform domains). The reading component (or "reader" or "decoder") may analyze target content to detect whether a watermark is present. In applications where the watermark encodes information (e.g., a message or auxiliary information), the reader may extract this information from a detected watermark.

A watermark embedding process may convert a message, signal, etc., into a payload conveyed by a watermark signal. The embedding process may then combine the watermark signal with media content and possibly other signals (e.g., a transform domain-based orientation pattern or synchronization signal) to create watermarked media content. The process of combining the watermark signal with the media content may be a linear or non-linear function. The watermark signal may be applied by modulating or altering signal samples in a spatial, temporal or transform domain.

A watermark encoder may analyze and selectively adjust media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of a host signal associated with the media content, a modulation of frequency coefficients of the host signal, a given frequency pattern, a given quantizer (e.g., in Quantization Index Modulation) etc.

The present assignee's work in steganography, data hiding and digital watermarking is reflected, e.g., in U.S. Pat. Nos. 7,013,021, 6,993,154, 6,947,571, 6,912,295, 6,891,959, 6,763,123, 6,718,046, 6,614,914, 6,590,996, 6,449,377, 6,408,082, 6,345,104, 6,122,403 and 5,862,260. Some 3rd-party work is reflected in, e.g., U.S. Pat. Nos. 7,130,442; 6,208,735; 6,175,627; 5,949,885; 5,859,920. Each of the patent documents identified in this paragraph is hereby incorporated by reference herein in its entirety. Of course, a great many other approaches are familiar to those skilled in the art, e.g., Avcibas, et al., "Steganalysis of Watermarking Techniques Using Images Quality Metrics", Proceedings of SPIE, January 2001, vol. 4314, pp. 523-531; Dautzenberg, "Watermarking Images," Department of Microelectronics and Electrical Engineering, Trinity College Dublin, 47 pages, October 1994; Hernandez et al., "Statistical Analysis of Watermarking Schemes for Copyright Protection of Images," Proceedings of the IEEE, vol. 87, No. 7, July 1999; J. Fridrich and J. Kodovský. Rich models for steganalysis of digital images, IEEE Transactions on Information Forensics and Security, 7(3):868-882, June 2011; J. Kodovský, J. Fridrich, and V. Holub. Ensemble classifiers for steganalysis of digital media, IEEE Transactions on Information Forensics and Security, 7(2):432-444, 2012; and T. Pevný, P. Bas, and J. Fridrich. Steganalysis by subtractive pixel adjacency matrix, IEEE Transactions on Information Forensics and Security, 5(2):215-224, June 2010; I. J. Cox, M. L. Miller, J. A. Bloom, J. Fridrich, and T. Kalker. Digital Watermarking and Steganography, Morgan Kaufman Publishers Inc., San Francisco, Calif., 2007; R. O. Duda, P. E. Hart, and D. H. Stork. Pattern Classification. Wiley Interscience, New York, 2nd edition, 2000; each of which is hereby incorporated herein by reference in its entirety. The artisan is presumed to be familiar with a full range of literature concerning steganography, data hiding and digital watermarking.

Digital watermarking may be used to embed auxiliary information into cover media (e.g., images, packaging, graphics, etc.) such that changes to the cover media to convey the digital watermarking remain invisible to humans but allows machines to reliably extract the auxiliary information even after common signal-processing operations (e.g., noise, filtering, blurring, optical capture). This allows machines to uniquely identify objects depicted in captured imagery. Digital watermarking has been used for applications including media content protection, track and trace, etc.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In FIG. 2A, illustrated textual elements (e.g., "Heart Healthy," "May reduce the risk of heart disease," "Concordia Superstores," "Apple Cinnamon Oatmeal," etc.) and certain graphical elements (e.g., the red heart, the green and white logo above "Concordia") are vector images, whereas the remainder of the elements (e.g., the apples, the bowl of oatmeal, the syrup, cinnamon sticks, the oats in the background, etc.) are raster images.

In FIG. 2B, the heat map is overlaid by outlines of some of the aforementioned graphical elements discussed above with respect to FIG. 2A.

DETAILED DESCRIPTION

Embodiments of the present invention relate to estimating the signal strength of a watermark signal embedded within media content. In these embodiment, the signal strength represents a measure indicating how easy or difficult a watermark signal, embedded within media content, can be detected or decoded by a reader. Generally, the techniques disclosed herein are applicable to watermark signals embedded within media content such as consumer packaging (e.g., beverages, food, toiletries, cosmetics, small appliances, etc.), documents, labels, tags, stickers, books, posters, etc., as well as to embedded watermark signals that are visually conveyed by electronic displays, or are otherwise embedded or present within surface textures of physical objects, or the like or any combination thereof.

When included in consumer packaging, auxiliary information conveyed by a watermark signal can include information such as a universal product code (UPC) number, a global trade item number (GTIN), application identifier (AI) number (e.g., as used within UCC/EAN-128 Symbols), an electronic product code (EPC), a globally unique identifier (GUID), recycling information, product information, distribution information, retail channel information, labelling information, an index to such information, or the like or any combination thereof. Assignee's U.S. patent application Ser. No. 14/611,515, filed Feb. 2, 2015, (published as U.S. Ser. No. 2015/0302543 A1), which is hereby incorporated herein by reference in its entirety, describes additional examples of auxiliary information that may be conveyed by a digital watermark. Because a large surface area of a package can be watermarked, consumers, retail check-out personnel, etc., do not need to search for barcode at checkout, thus leading to overall speedup of the checkout process. U.S. Patent App. Pub. Nos. 2013/0223673 and 2014/0112524, each of which is hereby incorporated herein by reference in its entirety, discusses related use scenarios. Such retail checkout scenarios are improved when digital watermarking can be located and decoded in a timely manner as watermarked packaging is swiped or moved in front of an optical scanner (or camera).

Once embedded into cover media, the signal strength of the embedded watermark signal may vary depending upon factors such as the presence, type, color, etc., of any pattern, texture or gradient depicted by the cover media where the watermark was embedded, or in the vicinity thereof. Further, watermark signals are typically embedded into imagery by changing data representing pixel values of images (e.g., raster images). In practice, however, it is common to stack a vector image over a raster image (e.g., by assigning vector and raster image to different layers supported by digital image editing software such as ADOBE PHOTOSHOP, PHOTO-PAINT, PAINT SHOP PRO, GIMP, PAINT.NET, STYLEPIX, etc.). Stacking a vector image over a watermarked raster image can degrade the signal strength of the embedded watermark signal. To address these and other problems, numerous embodiments for estimating the signal strength of a watermark signal embedded within media content are discussed in greater detail below. To provide a comprehensive disclosure without unduly lengthening the specification, applicant hereby incorporates by reference certain referenced patent documents, each in their entirety. These documents also disclose other technologies and teachings that can be incorporated into the arrangements detailed herein, and into which the technologies and teachings detailed herein can be incorporated.

The methods, processes, components, apparatus and systems described herein may be implemented in hardware, software or a combination of hardware and software. For example, the watermark encoding processes and embedders may be implemented in software, firmware, hardware, combinations of software, firmware and hardware, a programmable computer, electronic processing circuitry, processors, parallel processors, or by executing software or instructions with processor(s) or circuitry. Example software includes, e.g., C, C++, Visual Basic, Java, Python, Tcl, Perl, Scheme, Ruby, executable binary files, etc. Similarly, watermark data decoding or decoders may be implemented in software, firmware, hardware, combinations of software, firmware and hardware, a programmable computer, electronic processing circuitry, or by executing software or instructions with a multi-purpose electronic processor, parallel processors or multi-core processors, or other multi-processor configurations.

Applicant's work also includes taking the scientific principles and natural laws on which the present technology rests, and tying them down in particularly defined implementations. One such implementation uses the hardware/software apparatus mentioned above. Another such implementation is electronic circuitry that has been custom-designed and manufactured to perform some or all of the component acts, as an application specific integrated circuit (ASIC).

To realize such an ASIC implementation, some or all of the technology is first implemented using a general purpose computer, using software such as MatLab (from Mathworks, Inc.). A tool such as HDLCoder (also available from Math Works) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.) Several detailed embodiments are now described.

A. Embodiment 1

Figure 1:
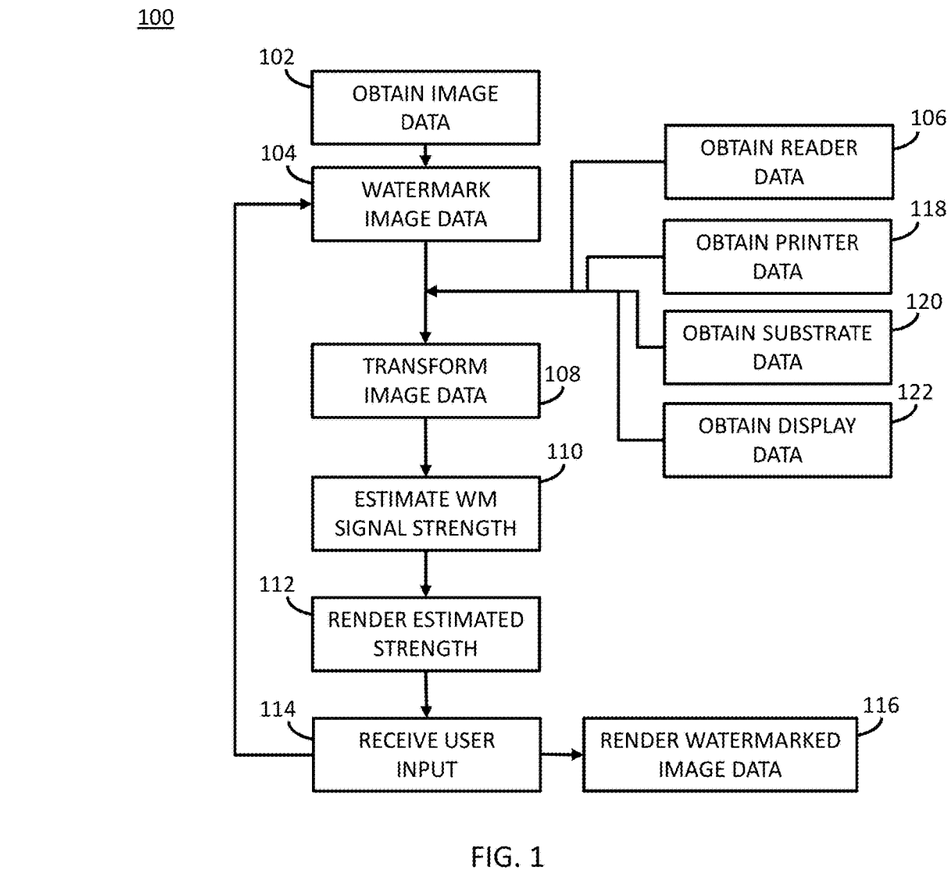
FIG. 1 is a flow chart illustrating various embodiments of a watermark embedding process.

At 102, image data is obtained. Generally, the image data is obtained in one or more raster file formats (e.g., TIFF, PSD, EPS, JPG, PNG, BMP, etc.), one or more vector file formats (e.g., EMF, EPS, PDF, PS, etc.), or the like or any combination thereof. The image data represents imagery as a raster image, a vector image or any combination thereof (e.g., represented by one or more different "layers" of imagery, as is understood in the field of digital image editing).

Generally, the image data represents imagery in a color mode selected from the group including, e.g., grayscale, indexed, bitmap, RGB, CMYK, Lab, HSB, HSL, duotone, multichannel, PMS, or the like or any combination thereof. In one embodiment, the image data may be accompanied by color mode data describing the color mode with which the imagery is represented. In another embodiment, the obtained image data may be processed according to any known technique to derive the color mode data.

At 104, the image data is processed to embed one or more watermark signals (e.g., each conveying an orientation or synchronization pattern, auxiliary information, or the like or any combination thereof) therein. Exemplary techniques that may be used for embedding a watermark signal are described in aforementioned U.S. Pat. Nos. 7,130,442, 7,013,021, 6,993,154, 6,947,571, 6,912,295, 6,891,959, 6,763,123, 6,718,046, 6,614,914, 6,590,996, 6,449,377, 6,408,082, 6,345,104, 6,208,735, 6,175,627, 6,122,403, 5,949,885, 5,862,260 and 5,859,920, or the like or any combination thereof. Additional techniques are disclosed in US Published Patent Appln. No. 2015-0156369, and U.S. patent application Ser. No. 14/725,399, filed May 29, 2015, (published as U.S. Ser. No. 2016/0275639 A1) and Ser. No. 14/842,575, filed Sep. 1, 2015, (published as U.S. Ser. No. 2017-0004597 A1),which are hereby incorporated herein by reference in their entirety.

In one embodiment, the image data represents imagery as a raster image and a vector image, and one or more blocks or patches of the raster image is watermarked at a location that is overlapped by the vector image. In another embodiment, the image data simply represents imagery as a one or more raster images, and does not represent a vector image.

At 106, reader data is obtained. In one embodiment, the reader data may include the reader color profile data describing an input color profile (e.g., in an ICC color profile format) of one or more readers configured to detect or decode one or more watermark signals embedded within the image data. In other embodiments, reader data may include reader identifier data (e.g., specifically identifying one or more readers configured to detect or decode the embedded watermark signal(s)), reader type data (e.g., identifying one or more types of readers configured to detect or decode the embedded watermark signal(s)), reader manufacturer data (e.g., identifying one or more manufacturers of readers configured to detect or decode the embedded watermark signal(s)), or the like or any combination thereof. In such other embodiments, the reader identifier data, reader type data, reader manufacturer data, etc., may be used as an index in a database to look up associated reader color profile data representing the input color profile of the reader. Reader type data can identify types of readers as hand-held readers (e.g., a specially-designed reader such as the JOYA or the POWERSCAN series, both offered by DATALOGIC, or a reader implemented as software—such as DIGIMARC DISCOVER, offered by DIGIMARC—operating on a smartphone—such as an IPHONE, offered by APPLE, etc.), fixed-position readers (e.g., so-called "in-counter scanners"), a laser scanners, CCD readers, camera-based readers, video camera readers, or the like or any combination thereof.

At 108, upon obtaining the color mode data and the reader color profile data, the watermarked image data is processed to transform the imagery having the embedded watermark signal(s) from an initial color mode (e.g., the color mode with which the imagery was initially represented by the image data obtained at 102) to a transformed color mode (e.g., a color mode that corresponds to or is otherwise compatible with the input color profile of the reader) according to one or more known techniques. The transformed image data thus represents the imagery in a color space for which the reader is designed.

At 110, the transformed image data is analyzed to estimate the signal strength of the embedded watermark signal. Examples of techniques for estimating the signal strength of the embedded watermark signal in the transformed image data are described in U.S. Pat. Nos. 8,051,295, 7,796,826, 7,607,016, 7,602,977, 7,352,878, 7,263,203, 7,085,396, 7,058,200, 7,006,662, 6,993,154 and 6,738,495, each of which is incorporated herein by reference in its entirety. Generally, the analysis is performed on individual blocks or patches of the transformed image data which may overlap one another, adjoin (i.e., so as to not overlap) one another, be adjacent to (i.e., so as to not adjoin) one another, or the like or any combination thereof.

Figure 2A:
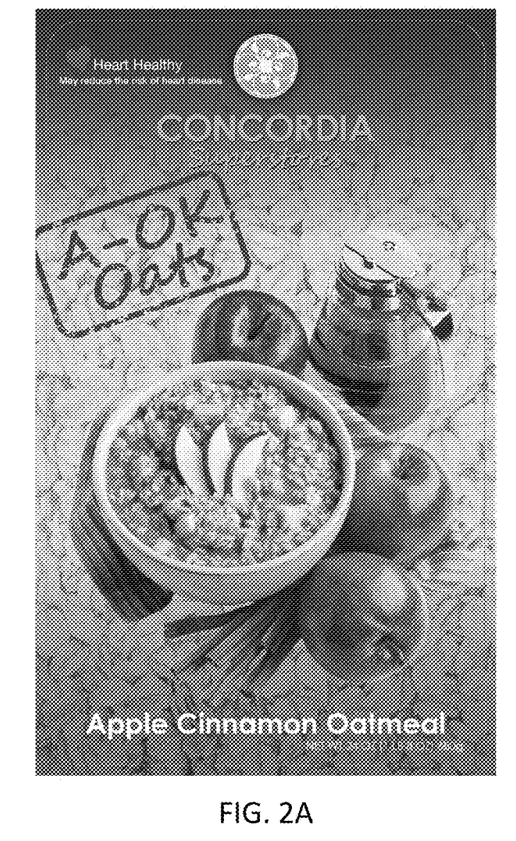
FIG. 2A illustrates an example of imagery (i.e., a front image of a box of oatmeal) conveying multiple instances of a watermark signal and represented by image data that has been transformed as discussed with respect to FIG. 1.
Figure 2B:
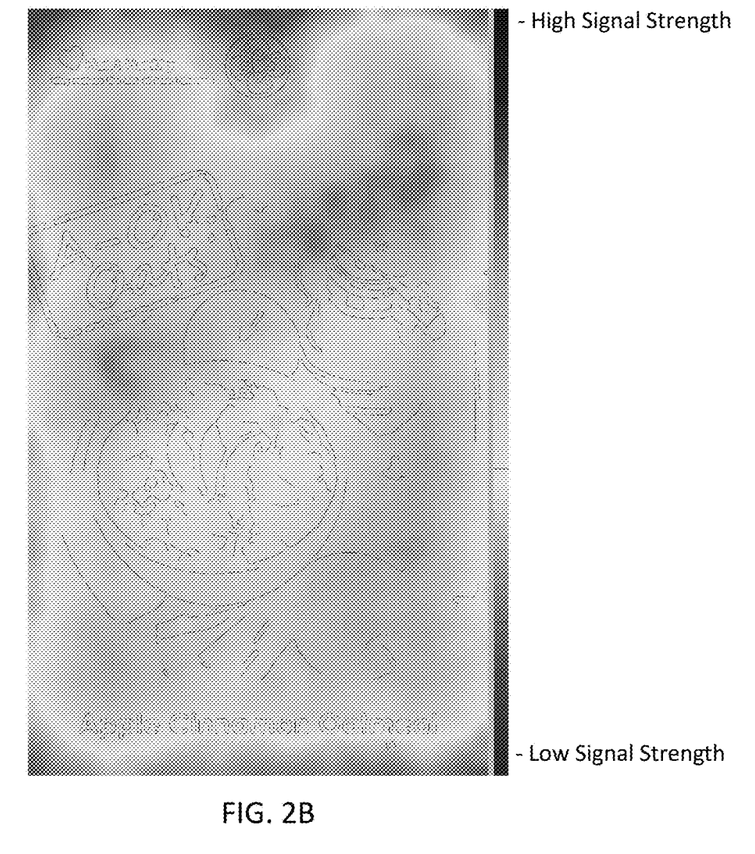
FIG. 2B illustrates a representation (e.g., rainbow-colored a "heat map") of estimated watermark signal strength at different areas of the imagery illustrated in FIG. 2A.

At 112, results of the estimated signal strength may be rendered (e.g., via a display such as a computer monitor communicatively coupled to a computer that performed an act at 104, 106, 108, or the like or any combination thereof) so that a user can identify areas in imagery represented by the transformed image data (e.g., the imagery illustrated in FIG. 2A) where the watermark signal strength is unacceptably low (e.g., in the vicinity of the depicted green and white logo above "Concordia," in the vicinity of the oatmeal depicted in the bowl, etc., as illustrated by the heat map shown in FIG. 2B).

Upon viewing the rendering of the estimated signal strength, the user may, at 114, provide one or more commands, instructions, or other input (e.g., by interacting with some user interface, keyboard, mouse, touch-screen, stylus, or the like or any combination thereof) to identify one or more blocks or patches of the transformed image data where the watermark signal strength is to be adjusted (e.g., increased). Optionally, the user input indicates an amount or percentage by which the user desires the watermark signal strength be increased. In one embodiment, the user input may also allow the user to decrease watermark signal strength in one or more blocks or patches of the transformed image data (e.g., in cases where the user determines that the watermark signal is undesirably visible).

Upon receiving the user input, the signal strength of the identified blocks/patches can be adjusted (e.g., as described in any of aforementioned U.S. Pat. No. 8,051,295, 7,796, 826, 7,607,016, 7,602,977, 7,352,878, 7,263,203, 7,085,396, 7,058,200, 7,006,662, 6,993,154 or 6,738,495, or any combination thereof) and, in one embodiment, one or more of the watermark signals can be re-embedded (e.g., at 104) according to the adjusted signal strength. The above described acts (e.g., 108, 110, 112 and 114) may thereafter performed again, as desired until the watermark signal strength is acceptably strong. In another embodiment, however, the user input received at 114 can indicate that the watermarked signal strength is acceptably high, and the watermarked image data obtained as a result of performing (or re-performing) the watermark embedding at 104 is rendered at 116. As used herein, watermarked image data is rendered by generating one or computer-readable files (e.g., each having a raster file format, a vector file format, or the like or any combination thereof) representing the watermarked image data, storing the computer-readable file (e.g., in a computer-readable memory such as Flash memory, hard drive, magnetic tape, optical disk, or the like or any combination thereof), transmitting the computer-readable file (e.g., via FTP, Ethernet, WiFi, or the like or any combination thereof), printing the imagery represented by the watermarked image data, or the like or any combination thereof.

Notwithstanding the foregoing, it will be appreciated that identification of one or more blocks or patches or adjustment of the watermark signal strength can be performed automatically (e.g., without receiving user input) or semi-automatically (e.g., upon receipt of user input identifying one or more blocks or patches of the transformed image data where the watermark signal strength is to be adjusted).

B. Embodiment 2

In this embodiment, the embedding workflow may be performed as described above with respect to "Embodiment 1," but may be performed by reference to the color gamut of the printer(s) that will be used to print imagery represented by the watermarked image data. In this Embodiment 2, therefore, printer data is obtained at 118, which includes the printer color profile data describing an output color profile (e.g., in an ICC color profile format) of one or more printers configured to print the watermarked image data. In other embodiments, printer data may include printer identifier data (e.g., specifically identifying one or more printers configured to print the watermarked image data, printer type data (e.g., identifying one or more types of printers configured to print the watermarked image data), printer manufacturer data (e.g., identifying one or more manufacturers of printers configured to print the watermarked image data), or the like or any combination thereof. In such other embodiments, the printer identifier data, printer type data, printer manufacturer data, etc., may be used as an index in a database to look up associated printer color profile data representing the output color profile of the printer. Printer type data can identify types of printers according to the printing processes they are designed to carry out, such as offset lithography, flexography, digital printing (e.g., inkjet, xerography, etc.), gravure, screen printing, or the like or any combination thereof.

At 108, upon obtaining the color mode data and the printer color profile data, the watermarked image data is processed to transform the imagery having the embedded watermark signal(s) from an initial color mode (e.g., the color mode with which the imagery was initially represented by the image data obtained at 102) to a transformed color mode (i.e., a color mode that corresponds to or is otherwise compatible with the output color profile of the printer) according to one or more known techniques. The transformed image data thus represents the imagery in a color space in which the printer will print imagery (e.g., at 116).

In one embodiment, the watermarked image data is not transformed according to the reader color profile data (and, thus, act 106 can be omitted). In another embodiment, however, the transformation at 108 can be based upon the reader color profile data (and, thus, act 106 may be performed). For example, after initially transforming the watermarked image data by reference to the printer color profile data, the initially-transformed watermarked image data can be subsequently transformed by reference to the reader color profile data (e.g., as discussed above with respect to Embodiment 1).

C. Embodiment 3

In this embodiment, the embedding workflow may be performed as described above with respect to "Embodiment 1" or "Embodiment 2," but may be performed by reference to the substrate onto which imagery represented by the watermarked image data will be printed. In this Embodiment 3, therefore, substrate data is obtained at 120, which includes information describing the type of substrate (e.g., paper, cardboard, metal, plastic, foil, etc.) on which the watermarked image data will be printed, the surface finish of the substrate (e.g., matte, glossy, etc.), or the like or any combination thereof.

At 108, upon obtaining the color mode data and the substrate data, the watermarked image data is processed to estimate or otherwise emulate the appearance of the watermarked imagery when rendered on a substrate associated with the substrate data. In one embodiment, the watermarked image data is not transformed according to the reader color profile data or the printer color profile data (and, thus, acts 106 and 118 can be omitted). In another embodiment, however, the transformation at 108 can be based upon the printer color profile data (and, thus, act 118 may be performed, and the watermarked image data may be transformed by reference to the printer color profile data before transforming the watermarked image data by reference to the substrate data). In another embodiment, the transformation at 108 can be further based upon the reader color profile data (and, thus, act 106 may be performed, so that the watermarked image data is transformed by reference to the reader color profile data after being transformed by reference to the substrate data).

D. Embodiment 4

In this embodiment, the embedding workflow may be performed as described above with respect to "Embodiment 1," but may be performed by reference to the color gamut of the electronic display(s) that will be used to visually convey imagery represented by the watermarked image data. In this Embodiment 4, therefore, display data is obtained at 122, which includes the display color profile data describing an output color profile (e.g., in an ICC color profile format) of one or more displays configured to display the watermarked image data (e.g., at 116). In other embodiments, display data may include display identifier data (e.g., specifically identifying one or more displays configured to display the watermarked image data, display type data (e.g., identifying one or more types of displays configured to display the watermarked image data), display manufacturer data (e.g., identifying one or more manufacturers of printers configured to display the watermarked image data), or the like or any combination thereof. In such other embodiments, the display identifier data, display type data, display manufacturer data, etc., may be used as an index in a database to look up associated display color profile data representing the output color profile of the display.

At 108, upon obtaining the color mode data and the display color profile data, the watermarked image data is processed to transform the imagery having the embedded watermark signal(s) from an initial color mode (e.g., the color mode with which the imagery was initially represented by the image data obtained at 102) to a transformed color mode (e.g., a color mode that corresponds to or is otherwise compatible with the output color profile of the display) according to one or more known techniques. The transformed image data thus represents the imagery in a color space in which the display will present imagery.

Possible Combinations:

A few combinations of features include the following. Of course, this is not an exhaustive list since many other combinations are evident from the above detailed description.

A. A method comprising:

obtaining image data representing imagery in a first color mode;

steganographically embedding a watermark signal into the image data, thereby generating watermarked image data;

obtaining reader data representing an input color mode of a reader configured to detect or decode the watermarked image data, wherein the input color mode is different from the first color mode;

transforming the watermarked image data from the first color mode to the input color mode;

estimating a signal strength of the watermark signal within the transformed watermark image data; and re-embedding the watermark signal in the image data based upon the estimated signal strength within the transformed image data.

B. A method comprising:

obtaining image data representing imagery;

steganographically embedding a watermark signal into the image data, thereby generating watermarked image data;

obtaining printer data representing an output color mode of a printer configured to print the watermarked image data;

transforming the watermarked image data to the output color mode;

obtaining reader data representing an input color mode of a reader configured to detect or decode printed watermarked image data, wherein the input color mode is different from the output color mode;

transforming the watermarked image data from the output color mode to the input color mode;

estimating a signal strength of the watermark signal within the transformed watermark image data; and re-embedding the watermark signal in the image data based upon the estimated signal strength within the transformed image data.

C. A system comprising:

a processor;

at least one non-transitory, computer-readable medium communicatively coupled to the processor, wherein at least one non-transitory, computer-readable medium stores image data, reader data and, optionally, printer data, and wherein at least one non-transitory, computer-readable medium stores instructions to cause the processor to perform the method of any of combination A or B; and optionally, a display communicatively coupled to the processor.

D. A non-transitory, computer-readable medium comprising instructions to cause a computer processor to perform the method of any one of combination A or B.

E. An apparatus comprising:

means for obtaining image data representing imagery in a first color mode;

steganographically embedding a watermark signal into the image data, thereby generating watermarked image data;

means for obtaining reader data representing an input color mode of a reader configured to detect or decode the watermarked image data, wherein the input color mode is different from the first color mode;

means for transforming the watermarked image data from the first color mode to the input color mode;

means for estimating a signal strength of the watermark signal within the transformed watermark image data; and means for re-embedding the watermark signal in the image data based upon the estimated signal strength within the transformed image data.

F. An apparatus comprising:

means for obtaining image data representing imagery;

means for steganographically embedding a watermark signal into the image data, thereby generating watermarked image data;

means for obtaining printer data representing an output color mode of a printer configured to print the watermarked image data;

means for transforming the watermarked image data to the output color mode; means for obtaining reader data representing an input color mode of a reader configured to detect or decode printed watermarked image data, wherein the input color mode is different from the output color mode;

means for transforming the watermarked image data from the output color mode to the input color mode;

means for estimating a signal strength of the watermark signal within the transformed watermark image data; and means for re-embedding the watermark signal in the image data based upon the estimated signal strength within the transformed image data.

CONCLUSION

For the avoidance of doubt we expressly contemplate the combination of subject matter under any above embodiment with the subject matter from the other such detailed embodiments.

Having described and illustrated the principles of the technology with reference to specific embodiments, it will be recognized that the technology can be implemented in many other, different, forms. To provide a comprehensive disclosure without unduly lengthening the specification, applicant hereby incorporates by reference each of the above referenced patent documents in its entirety. Such documents are incorporated in their entireties, even if cited above in connection with specific of their teachings. These documents disclose technologies and teachings that can be incorporated into the arrangements detailed herein, and into which the technologies and teachings detailed herein can be incorporated.

The particular combinations of elements and features in the above-detailed embodiments are exemplary only; the interchanging and substitution of these teachings with other teachings in this and the incorporated-by-reference patents are also contemplated.

What is claimed is:

1. A method comprising:

obtaining image data representing imagery in a first color mode;

steganographically embedding a watermark signal into the image data, thereby generating watermarked image data;

obtaining reader data representing an input color mode of a reader configured to detect or decode the watermarked image data, wherein the input color mode is different from the first color mode;

transforming the watermarked image data from the first color mode to the input color mode, in which the input color mode corresponds to or is compatible with a color space associated with the reader;

estimating a signal strength of the watermark signal within the transformed watermark image data; and visually displaying the estimated signal strength spatially relative to the image data, with a first color representing first signal strength and a second color representing second signal strength, in which the second signal strength comprises a higher signal strength relative to the first signal strength, and with a third color representing a third signal strength comprising a signal strength between the first signal strength and the second signal strength.

2. The method of claim 1 in which the estimated signal strength is visually displayed as a multi-color heat map spatially relative to the image data.

3. A non-transitory, computer-readable medium comprising instructions to cause a computer processor to perform the method of claim 1.

4. A method comprising:
- obtaining image data representing imagery;
- steganographically embedding a watermark signal into the image data, thereby generating watermarked image data;
- obtaining printer data representing an output color mode of a printer configured to print the watermarked image data;
- transforming the watermarked image data to the output color mode;
- obtaining reader data representing an input color mode of a reader configured to detect or decode printed watermarked image data, wherein the input color mode is different from the output color mode;
- transforming the watermarked image data from the output color mode to the input color mode, in which the input color mode corresponds to or is compatible with a color space associated with the reader;
- estimating a signal strength of the watermark signal within the transformed watermark image data; and
- visually displaying the estimated signal strength spatially relative to the image data.

5. The method of claim 4 in which the estimated signal strength is visually displayed as a multi-color heat map spatially relative to the image data.

6. A non-transitory, computer-readable medium comprising instructions to cause a computer processor to perform the method of claim 4.

7. A method comprising:
- obtaining image data representing imagery;
- encoding data representing picture portions of the image data with a plural-bit signal, thereby generating encoded image data;
- obtaining substrate data associated with a type of or surface finish of a substrate upon which the encoded image data will be printed during printing, the printing to yield printed encoded image data;
- obtaining reader data associated with a reader configured to detect or decode the plural-bit signal from the printed encoded image data;
- adapting the encoded image data according to the substrate data and the reader data, said adapting yielding adapted encoded image data;
- estimating a signal strength of the plural-bit signal encoded within the adapted encoded image data; and
- visually displaying the estimated signal strength spatially relative to the image data.

8. The method of claim 7 in which the estimated signal strength is visually displayed as a multi-color heat map spatially relative to the image data.

9. The method of claim 8 in which the estimated signal strength is visually displayed spatially relative to the image data with a first color representing first signal strength and a second color representing second signal strength, in which the second signal strength comprises a signal strength that is relative higher than the first signal strength.

10. The method of claim 9, further comprising visually displaying the estimated signal strength spatially relative to the image data, with a third color representing a third signal strength comprising a signal strength between the first signal strength and the second signal strength.

11. The method of claim 7 in which said adapting adapts the encoded image data according to the substrate data, the reader data and color profile information of a printer that will print the printed encoded image data.

12. The method of claim 7 in which the substrate data associated with a substrate upon which the encoded image data will be printed comprises data associated with surface finish.

13. The method of claim 7 in which the substrate data associated with a substrate upon which the encoded image data will be printed comprises data associated with a plastic or metal substrate.

14. The method of claim 7 in which the reader data associated with the reader comprises a color profile associated with the reader.

15. The method of claim 14 in which the color profile comprises an ICC color profile format.

16. The method of claim 7 in which the reader data associated with the reader comprises reader type information.

17. The method of claim 7 in which said encoding data representing picture portions of the image data with a plural-bit signal comprises digital watermarking.

18. The method of claim 7 in which said encoding data representing picture portions of the image data with a plural-bit signal comprises steganographic encoding.

19. The method of claim 7 in which the substrate data comprises data associated with a type of substrate, the type of substrate comprising paper, cardboard, metal, plastic or foil.

20. The method of claim 7 in which the substrate data comprises data associated with a surface finish of the substrate, the surface finish comprising matte or glossy.

21. A method comprising:
- obtaining image data representing imagery;
- embedding data representing picture portions of the image data with a plural-bit signal, thereby generating embedded image data;
- obtaining printer data associated with a printer that is expected to print the embedded image data, in which the printer yields printed embedded image data;
- obtaining reader data associated with a reader configured lo detect or decode the plural-bit signal from the printed embedded image data;
- processing the embedded image data according lo the printer data and the reader data, said processing yielding processed embedded image data;
- estimating a signal strength of the plural-bit signal embedded within the processed embedded image data; and
- visually displaying the estimated signal strength spatially relative to the image data.

22. The method of claim 21 in which the estimated signal strength is visually displayed as a multi-color heat map spatially relative to the image data.

23. The method of claim 21 further comprising re-embedding the data representing picture portions of the image data with a plural-bit signal based on an analysis of the estimated signal strength, the re-embedding limited to a subset of image patches that comprises less image patches relative to the image data, thereby generating re-embedded image data.

24. The method of claim 21 in which the printer data comprises printer color profile data describing an output color profile of the printer.

25. The method of claim 24 in which the output color profile comprises an ICC color profile.

26. The method of claim 21 in which the printer data comprises printer type data.

27. The method of claim 26 in which the printer type data comprises data identifying a printing process comprising offset, flexography, or digital printing.

28. The method of claim 21 in which said embedding data representing picture portions of the image data with a plural-bit signal comprises digital watermarking.

29. The method of claim 21 in which said embedding data representing picture portions of the image data with a plural-bit signal comprises steganographic embedding.

30. The method of claim 21 in which the estimated signal strength is visually displayed spatially relative to the image data with a first color representing first signal strength and a second color representing second signal strength, in which the second signal strength comprises a signal strength that is relative higher than the first signal strength.

31. The method of claim 30, further comprising visually displaying the estimated signal strength spatially relative to the image data with a third color representing a third signal strength comprising a signal strength between the first signal strength and the second signal strength.

32. The method of claim 21 in which the printer data comprises printer identifier data or printer manufacturer data.

33. The method of claim 21 in which the primer data comprising data associated with the printer's color gamut.

\* \* \* \* \*

UNITED STATES PATENT AND TRADEMARK OFFICE
CERTIFICATE OF CORRECTION

PATENT NO. : 9,716,807 B2
APPLICATION NO. : 14/881448
DATED : July 25, 2017
INVENTOR(S) : Vojtech Holub and Tomas Filler It is certified that error appears in the above-identified patent and that said Letters Patent is hereby corrected as shown below:

In the Claims

Column 12, Claim 21, Line 39, delete "lo" and insert --to--.

Column 12, Claim 21, Line 41, delete "lo" and insert --to--.

Column 13, Claim 33, Line 21, delete "primer" and insert --printer--.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*